United States Patent
Gobius Du Sart

(10) Patent No.: US 10,011,680 B2
(45) Date of Patent: Jul. 3, 2018

(54) LACTIDE BLOCK COPOLYMER AND METHOD OF PREPARATION

(71) Applicant: PURAC BIOCHEM BV, Gorinchem (NL)

(72) Inventor: Gerrit Gobius Du Sart, Gorinchem (NL)

(73) Assignee: PURAC BIOCHEM BV, Gorinchen (NL)

( * ) Notice: Subject to any disclaimer, the term of this patent is extended or adjusted under 35 U.S.C. 154(b) by 0 days.

(21) Appl. No.: 15/504,219

(22) PCT Filed: Aug. 18, 2015

(86) PCT No.: PCT/EP2015/068949
§ 371 (c)(1),
(2) Date: Feb. 15, 2017

(87) PCT Pub. No.: WO2016/026859
PCT Pub. Date: Feb. 25, 2016

(65) Prior Publication Data
US 2017/0240696 A1    Aug. 24, 2017

(30) Foreign Application Priority Data
Aug. 19, 2014 (EP) .................................... 14181375

(51) Int. Cl.
*C08G 63/08* (2006.01)
*C08G 63/78* (2006.01)

(52) U.S. Cl.
CPC ............. *C08G 63/08* (2013.01); *C08G 63/78* (2013.01)

(58) Field of Classification Search
CPC ................................ C08G 63/08; C08G 63/78
See application file for complete search history.

(56) References Cited

U.S. PATENT DOCUMENTS

| | | | |
|---|---|---|---|
| 5,270,400 A | 12/1993 | Spinu | |
| 2010/0004404 A1 | 1/2010 | Suzuki et al. | |
| 2010/0324229 A1 * | 12/2010 | Komazawa | C08G 63/08 525/450 |
| 2012/0101248 A1 | 4/2012 | Matsuba et al. | |
| 2013/0165601 A1 * | 6/2013 | Takahashi | C08G 63/08 525/450 |

FOREIGN PATENT DOCUMENTS

| | | | | |
|---|---|---|---|---|
| EP | 2058351 A1 | 5/2009 | | |
| EP | 2098551 A1 | 9/2009 | | |
| JP | 2000-017163 | * | 1/2000 | ............. C08L 67/04 |
| WO | 2008/057214 A2 | 5/2008 | | |
| WO | 2009/045881 A1 | 4/2009 | | |
| WO | 2010/012770 A1 | 2/2010 | | |

OTHER PUBLICATIONS

Urayama, H., et al.; Macromolecular Materials and Engineering, 2003, vol. 288, No. 2, p. 137-143.*
Tsuji, H., et al.; Macromolecules, 1992, vol. 25, p. 5719-5723.*
Oct. 13, 2015 Search Report issued in International Patent Application No. PCT/EP2015/068949.
Abstract of Fukushima et al., "Stereoblock Poly(lactic acid): Synthesis via Solid-State Polycondensation of a Stereocomplexed Mixture of Poly(L-lactic acid) and Poly(D-lactic acid)," Macromolecular Bioscience, vol. 5, Issue 1, pp. 21-29, Jan. 2005.
Oct. 13, 2015 Written Opinion issued in International Patent Application No. PCT/EP2015/068949.

* cited by examiner

*Primary Examiner* — Robert Jones, Jr.
(74) *Attorney, Agent, or Firm* — Oliff PLC

(57) ABSTRACT

A method for producing a lactide block copolymer, to a lactide block copolymer and to an article including the lactide block copolymer. In particular, the instant invention relates to an improved lactide block copolymer which may be obtained by providing a polymer of a first lactide monomer including a residual amount of the first monomer, adding and polymerizing a first amount of a second monomer of opposite chirality and subsequently adding and polymerizing a second amount of the second monomer. The resulting lactide block copolymer generally has a high melting point (e.g. from 190 to 250° C.).

16 Claims, 2 Drawing Sheets

LACTIDE BLOCK COPOLYMER AND METHOD OF PREPARATION

Figure 1:
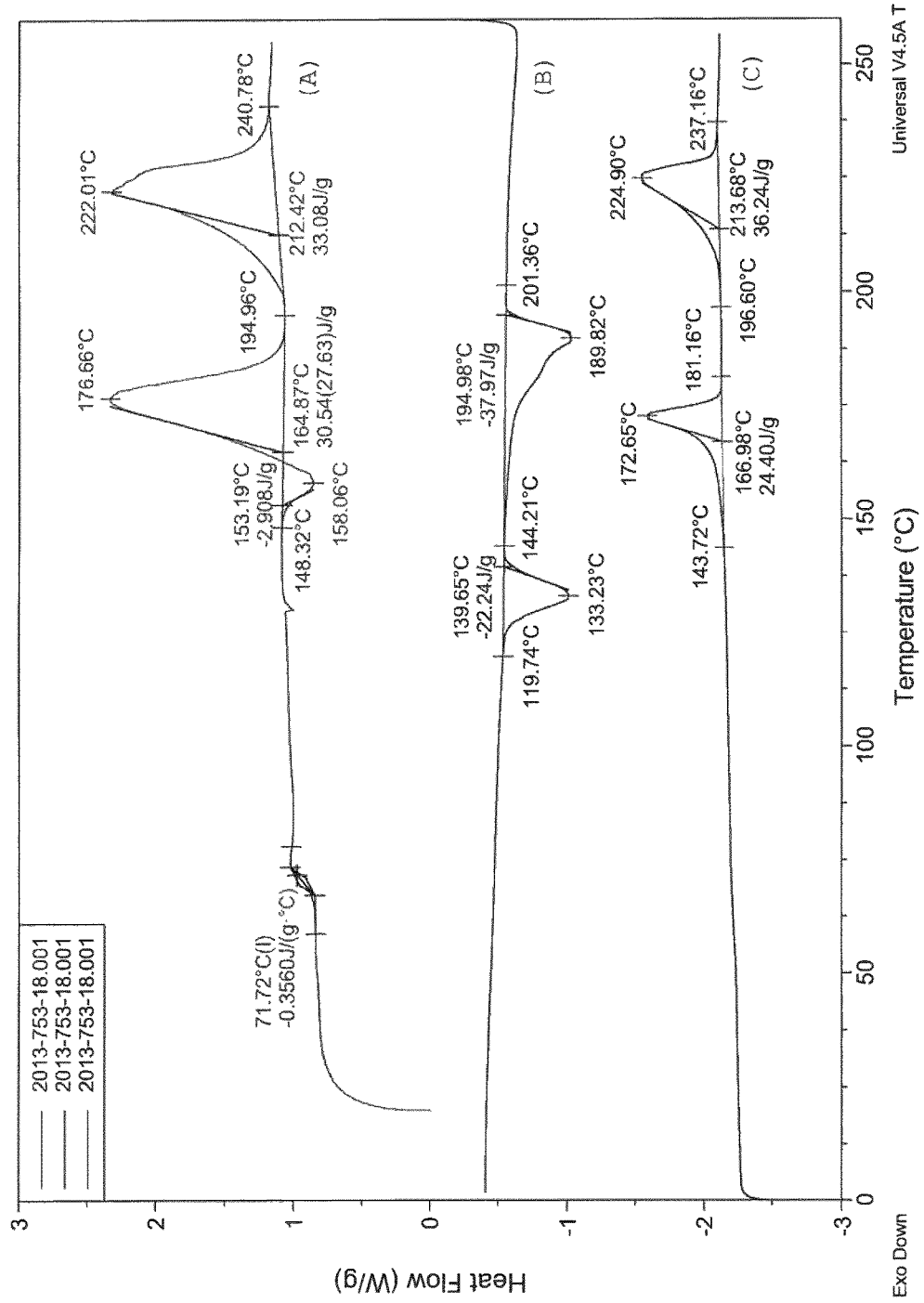

The instant invention relates to a method for producing a lactide block copolymer, to a lactide block copolymer and to an article comprising said lactide block copolymer.

Biobased polymers are interesting as alternatives to petroleum-derived materials. Biobased polymers are attractive both for their numerous end of life options, including degradability, and for the fact that they can be obtained from renewable resources. Polylactic acid, also known as polylactide or PLA, has drawn particular attention as a polymer that can be degraded under industrial composting conditions. Further, the raw material for producing polylactic acid (e.g. lactic acid or lactide) can be obtained from sugars derived from the agricultural industry.

Polylactic acid has attractive properties, such as high stiffness and the fact that it can be melt processed into, e.g., fibers, films and injection molded products. However, commonly used polylactic acid generally suffers from low heat resistance and low toughness, which reduces its practical application as a general-purpose polymer.

There is a continuous search for polylactic acid grades that show increased heat resistance. It has been previously shown that the melting point of polylactic acid can be increased from about 130-180° C. to about 190-250° C. by the formation of a so-called stereocomplex. A stereocomplex is a crystalline structure formed by the interaction of polylactic acid homopolymers of opposite chirality, namely between the polymer of the L-enantiomer of lactic acid (or lactide), also referred to as PLLA and the polymer of the D-enantiomer of lactic acid (or lactide), also referred to as PDLA. In principle, the heat resistance of a PLA article can be increased quite significantly if crystallinity is imparted into products made of PLA and if PLA comprises such stereocomplex crystallites. The presence of a significant amount of stereocomplex crystallites increases the temperature window in which the material can be used.

Blends of PLLA and PDLA are known to form stereocomplex PLA, also referred to herein as stereocomplex blends. However, obtaining a high stereocomplex content in such PLA blends is not an easy task. In general, homogeneous mixing of high molecular weight polymers is very difficult and often requires special equipment (such as (twin-screw) extruders and batch kneaders), special mixing conditions (e.g. well-defined extrusion parameters) and it might even require the use of additives such as compatibilizers, nucleating agents and/or chain extenders. Furthermore, PLLA and PDLA blends often tend to re-crystallize after melt processing into a mixture of the homopolymer and stereocomplex crystals.

An alternative to stereocomplex blends of PLLA and PDLA are stereoblock copolymers of PLLA and PDLA, also known as stereoblock PLA. Such block copolymers have two different types of polymeric blocks with repeating units derived from lactic acid monomers (or lactide monomers) of opposite chirality, generally a polymeric block of L-lactic acid (or L-lactide) and a polymeric block of D-lactic acid (or D-lactide). The distinct polymeric blocks are covalently bound to each other in the same macromolecule and thus are in close proximity. Accordingly, in order to form stereocomplex crystalline structures between polymeric blocks of opposite chirality there is no need for blending. Further, such block copolymers may form smaller crystals than crystals achieved from stereocomplex blends. Smaller crystals can have specific advantages such as improved crystallization speed and favorable optical properties in film applications.

As for the most common preparations of PLA, stereoblock copolymers may be prepared by polymerizing lactic acid monomers or lactide monomers. Lactide is the cyclic di-ester of lactic acid. Lactide monomers exist in enantiopure forms: L-lactide and D-lactide, which are the di-esters of L-lactic acid and D-lactic acid respectively; racemic form, which are mixtures of L-lactide and D-lactide, and in mesomeric form: DL-lactide, which is the di-ester of one D-lactic acid molecule and one L-lactic acid molecule, also referred to as meso-lactide.

The polymerization of lactide monomers is generally preferred because it occurs via a ring opening reaction, which allows the preparation of high molecular weight polymers, something which is considerably more difficult for the direct polycondensation of lactic acid.

Lactide polymerization may be performed in solution (in the presence of a polymerization solvent) or in the melt state (in the substantial absence of a polymerization solvent). Polymerization in the melt state, also referred to as melt polymerization, is generally preferred, for environmental, cost and safety reasons, mainly because it precludes the need of solvent and any problems associated to its removal and disposal.

Several methods have been described in the literature for the preparation of block copolymers.

For instance, the International Patent Application Nos. WO 2008/057214 and WO 2009/045881 and the article of Fukushima et al. in Macromolecular Biosciences from 2005 (vol. 5, pages 21-29) describe to independently provide poly L-lactide (PLLA) and poly D-lactide (PDLA), to mix PLLA and PDLA to form a blend, and to subsequently react PLLA and PDLA in the blend. Such methods suffer from the problems of blending PDLA and PLLA polymers as described above. Direct polycondensation of oligomers of PLLA and PDLA is also limited in terms of the molecular weight that can be obtained. In addition, the suggested solid-state polymerization times required are very long (tens of hours). Further, such methods require the separate preparation and purification of PDLA and PLLA which adds to the complexity of the method. Moreover, the specific methods described in these documents to react PLLA and PDLA also suffer from certain disadvantages. WO2008/057214 describes a method involving transesterification of PLLA and PDLA polymers, which is generally poorly controlled and suffers highly from melt degradation phenomena. WO2009/045881 describes a chain extension method using isocyanates. Such chain extension methods become increasingly difficult at higher molecular weights and use chemicals with significant health and safety hazards.

U.S. Patent Application Nos. US 2012/101248 and US 2010/004404 and European Patent Application No. EP 2 098 551 describe to polymerize a first enantiopure lactide monomer to provide a first polymeric lactide (PLLA or PDLA) and to subsequently polymerize a second enantiopure lactide monomer of opposite chirality in the presence of the preformed PLLA or PDLA to form a block copolymer having two distinct polymeric bocks, namely a PLLA block and a PDLA block.

A problem associated to such methods is that residual amounts of lactide monomer present in the first polymeric lactide detrimentally affect the rate of stereocomplex formation and the melting point of the resulting block copolymer.

As suggested in EP 2 098 551, a solution to this problem is to have low content of residual monomer in the first polymeric lactide, which may be achieved in the presence or absence of a step for the removal of excess lactide monomer.

The content of residual monomer in the first polymeric lactide is described to preferably be from 0 to 5% by mass.

Similarly, US 2010/004404 describes to remove the unreacted lactide monomer under reduced pressure. The lactide monomer content in the first polymeric lactide after removal is described to be of 0 wt. % or more and less than 1 wt. %.

As described in these documents, purification or removal steps are required to keep the amount of lactide monomer satisfactorily low. Such steps add expense and complexity to the processes of preparation of lactide block copolymers, in particular, in an industrial scale. For instance, when lactide is removed by evaporation, large and expensive vacuum systems are required which moreover operate at high melt temperatures—this can simultaneously cause degradation. On the other hand, precipitative methods require large amounts of solvents and non-solvents with high costs and hazards (e.g. flammability) associated to their use. If such removal steps are not performed, the residual amount of the lactide monomer in the first polymeric lactide is necessarily higher than 0 wt. %, because of the thermodynamic equilibrium of the reaction. For instance, at typical reaction temperatures (e.g. of 180-240° C.) the residual amount of lactide monomer may typically be above 4%. Even if a high conversion of monomer into polymer is achieved and the amount of residual monomer in the first polymeric lactide is relatively low, in the methods described the residual monomer will be randomly distributed within the block formed by the second monomer, resulting in a block with reduced enantiomeric purity. This detrimentally affects the stereocomplex formation and, consequently, detrimentally affects the melting point and crystallization properties of the lactide block copolymer.

It is an object of the present invention to provide a polylactic acid having a high molecular weight and a high melting point and a method of preparation thereof.

The inventors of the present invention have now found an improved method for producing such a polylactic acid which does not suffer from the above indicated problems. In particular, the inventors have now found that an improved lactide block copolymer may be obtained by providing a polymer of a first lactide monomer comprising a residual amount of said first monomer, adding and polymerizing a first amount of a second monomer of opposite chirality and subsequently adding and polymerizing a second amount of said second monomer. The resulting lactide block copolymer generally has a high melting point (e.g. from 190 to 250° C.).

A method as described herein precludes the need to remove the residual amount of first lactide monomer in the first polymeric lactide. Further the instant method allows for a better control of the structure of the final lactide block copolymer. In particular, by using such a method the residual amount of monomer present in the polymer of the first lactide monomer reacts with the first amount of the second lactide monomer to form a copolymeric block of the first and second monomer. The second amount of second monomer then forms a polymeric block of the second monomer which has a substantially reduced amount of the first lactide monomer. Thereby the distribution of the lactide monomers is controlled and the enantiomeric purity of the polymeric block of the second monomer is generally enhanced. The inventors have also found that the presence of the intermediate copolymeric block does not detrimentally effect the melting point of the lactide block copolymer. On the contrary, the melting point of lactide block copolymer obtained by a method as described herein is even higher when compared to lactide block copolymers wherein, e.g., the first polymeric lactide comprising a residual amount of first lactide monomer is reacted with the second lactide monomer in a single step. The copolymeric block may be varied in size and may be adapted to specific applications.

Accordingly, several aspects of the instant invention relate to a method for producing a lactide block copolymer by melt polymerization in the presence of a catalyst from a first lactide monomer and a second lactide monomer, the first and second lactide monomers being different from each other and being selected from L-lactide and D-lactide, wherein the method comprises the following steps:

a. polymerizing the first lactide monomer to provide a first polymerization mixture comprising a polymer of the first lactide monomer and a residual amount of the first lactide monomer;

b. adding a first amount of the second lactide monomer to the first polymerization mixture and polymerizing the resulting mixture to provide a second polymerization mixture comprising a copolymer having a polymeric block of the first lactide monomer and a copolymeric block of the first and the second lactide monomers;

c. adding a second amount of the second lactide monomer to the second polymerization mixture and polymerizing the resulting mixture to provide a third polymerization mixture comprising a copolymer having a polymeric block of the first lactide monomer, a copolymeric block of the first and the second lactide monomers, and a polymeric block of the second lactide monomer.

A lactide block copolymer as defined herein is a lactide polymer which comprises polymeric fragments which are constitutionally different (blocks) with repeating units derived from two different lactide monomers (L-lactide and D-lactide). In the lactide block copolymer adjacent blocks comprise a different composition with respect to the type of lactide monomer and its distribution, i.e. the lactide block copolymer has polymeric blocks of L-lactide, polymeric blocks of D-lactide and copolymeric blocks of both L-lactide and D-lactide.

The term monomeric lactide as used in the present description refers to lactide monomer (i.e. L-lactide monomer or D-lactide monomer). The term polymeric lactide as used in the present description refers to oligomers and polymers derived from lactide monomer (i.e. derived from L-lactide and/or D-lactide).

A method as described herein for producing a lactide block copolymer is a melt polymerization method which is carried out in the presence of a catalyst.

A melt polymerization is a polymerization which is carried out in such conditions that the polymerization takes place in the melt state. This means that the reactants and reaction products are in molten form. It is within the scope of a person skilled in the art to choose suitable polymerization conditions. Suitable polymerization temperatures are discussed in detail below when discussing the polymerization of steps a), b) and c). Other conditions such as type of reactor, pressure and volume in the reactor are not critical to the polymerization reaction. However, such other conditions may be taken into consideration by a skilled person when selecting the polymerization temperature.

A melt polymerization advantageously can be carried out in the substantial absence of solvent. As the reactants (e.g. lactide monomer and polymeric lactide) can react with each other in the molten state there is no need to dissolve the reactants in a solvent for them to react. If so desired minor amounts of solvent may be present in the process, e.g. added as a solvent for the catalyst or further polymerization additives. The process is intended to encompass situations where polymerization mixtures contain from 0 to 5 wt. % of solvent, with respect to the total amount of monomeric and polymeric lactide present in the reaction mixture, in particular less than 2 wt. %, more in particular less than 1 wt. %, still more in particular less than 0.5 wt. %.

The polymerization of lactide monomers takes place via a ring-opening polymerization mechanism. Catalysts suitable for performing ring-opening polymerization of lactide are known in the art.

In several embodiments, lactide may be polymerized in the presence of a catalyst of the formula $$(M)(X_1, X_2 \ldots X_m)_n$$

where M is selected from metals of Group 2, 4, 8, 9, 10, 12, 13, 14, and 15 of the Periodic Table of Elements; ($X_1$, $X_2 \ldots X_m$) are independently selected from the group of alkyls, aryls, oxides, carboxylates, halides, alkoxides, alkylesters; m is an integer ranging from 1 to 6, and n is an integer ranging from 1 to 6, wherein the values for m and n depend on the oxidation state of the metal ion.

Within Group 2 the use of Mg and Ca are preferred. Within Group 4 the use of Ti, Zr and Hf may be mentioned. Within Group 8 the use of Fe is preferred. Within Group 12 the use of Zn is preferred. Within Group 13 the use of Al, Ga, In, and Ti may be mentioned. Within Group 14 the use of Sn is preferred. Within Group 15 the use of Sb and Bi is preferred. In general, the use of metals of Groups 4, 14 and 15 is preferred. It is preferred for M to be selected from Sn, Zr, Hf, Zn, Bi and Ti. The use of a Sn-based catalyst may be particularly preferred.

For halides, tin halides like $SnCl_2$, $SnBr_2$, $SnCl_4$, and $SnBr_4$ may be mentioned. For oxides, SnO and PbO may be mentioned. Within the group of alkylesters, octoates (e.g., 2-ethyl hexanoates), stearates, and acetates may be mentioned. In particular, Sn-octoate, (also known as Sn(II) bis 2-ethyl hexanoate or simply as tin octoate), tin stearate, dibutyltin diacetate, butyltin tris (2-ethyl hexanoate), tin (2-ethyl hexanoate), bismuth (2-ethyl hexonate), tin triacetate, sodium (2-ethyl hexanoate), calcium stearate, magnesium stearate, and zinc stearate may be mentioned.

Other suitable compounds include tetraphenyltin, Sb tris (ethylene glycoxide), aluminum alkoxides, and zinc alkoxides.

It is within the competence of a person skilled in the art to select an appropriate amount of catalyst. For instance, the catalyst concentration during polymerization may typically be of at least 25 ppm, based on the total weight fraction of the catalyst with respect to the total amount of monomer and polymer, more in particular at least 50 ppm. Larger amounts may also be used, for instance the catalyst concentration may be at least 100 ppm. The catalyst concentration may generally be of at most 1000 ppm, in particular at most 500 ppm.

The use of Sn (II)-bis(2-ethylhexanoate) as the catalyst, also referred to as tin octoate, may be preferred, since this material is commercially available, liquid at typical purity levels and at room temperature and reaction temperature, as well as soluble in molten monomeric and polymeric lactide.

Catalysts as described herein are generally nonstereoselective.

If so desired, the melt polymerization may be carried out in the presence of co-catalyst (in addition to the catalyst). A co-catalyst is a compound that further increases the polymerization rate. Suitable co-catalysts are known in the art. Reference is made, for example, to U.S. Pat. No. 6,166,169. This reference describes co-catalysts of the formula $$(Y)(R_1, R_2 \ldots R_q)_p$$

where Y is an element selected from group 15 or 16 of the periodic system; ($R_1, R_2 \ldots R_q$) is a substituent independently selected from at least one of the compound classes of alkyls, aryls, oxides, halogenides, oxyalkyls, aminoalkyls, thioalkyls, phenoxides, aminoaryls and thioaryls; q is a whole number ranging from 1 to 6; and p is a whole number ranging from 1 to 6.

If present a co-catalyst may be generally used in an amount of the same order as the amount of catalyst, e.g., in a molar ratio of catalyst to co-catalyst of 50:1 to 1:50.

The co-catalyst may preferably include a phosphorous compound, in particular $P(R^1\ R^2\ R^3)$ with $R^1$, $R^2$, and $R^3$ being independently selected from aryl and alkyl groups and $P(Ph)_3$ may be particularly preferred. Suitable catalysts include for instance those described in U.S. Pat. No. 6,166,169.

Generally, polymerization initiators may also be used. Initiators, serve mostly as molecular weight control agents but also increase the rate of polymerization. Suitable initiators include, for instance, monofunctional and multifunctional nucleophiles such as alcohols, amines and sulfides. As it is known to a person skilled in the art, the choice of initiator will determine the chain topology of the resulting polymer (e.g. block copolymer). For example, 1-hexanol (monofunctional alcohol) as initiator will result in a linear polylactide with one growing chain, while initiator pentaerythritol (tetrafunctional alcohol) will form a four-arm star-shaped macromolecule. Furthermore, initiators of polymeric structure may also be used; this way, one can incorporate chemically different blocks (derived from the initiator) into polylactide block co-polymers. This may be desired to provide polylactide block copolymers with specific functionalities. Alcohol-functionalized polymeric initiators include but are not limited to polybutadienes, polyethyleneglycols, polypropylene glycols, polydimethyl siloxanes and polybutylene succinates or polybutylene succinate-co-adipates.

Polymerization may be performed in the presence of polymerization additives other than a co-catalysts and initiators, such as anti-oxidants, phosphates, epoxidised vegetable oil, and plasticizers.

It is within the scope of a person skilled in the art to select appropriate co-catalysts, initiators or other polymerization additives to be used together with the catalyst.

A method as described herein may be performed in batch, semi-continuous or continuous manner. In particular, a method as described herein may be a batch method or continuous method. A continuous method may be preferred, in particular when the method is to be performed in an industrial scale.

It is within the scope of a skilled person to select appropriate equipment and configurations suitable for performing melt polymerization of lactide in a method as described herein. As a mode of example, a method may be performed in a single reactor or in several reactors (e.g. connected in series). Suitable reactors may include for instance continuously stirred tanks, continuous static mixing reactors, loop reactors and plug-flow reactors. Reference is made to for instance WO 2010/012770 which describes the use of a continuous mixing reactor followed by a plug-flow reactor.

A lactide block copolymer as described herein is obtained from a first lactide monomer and a second lactide monomer, the first and second lactide monomers being different from each other and being selected from L-lactide and D-lactide. L-lactide and D-lactide monomers are commercially available or may be prepared from L-lactic acid and D-lactic acid respectively by methods known in the art.

Lactide monomers used in a method described herein generally are substantially pure L-lactide and substantially pure D-lactide. Substantially pure as used herein means that the source of L-lactide monomer or the D-lactide monomer generally have an L-lactide and D-lactide content of at least 98 wt. %, more in particular of at least 99 wt. %, and most in particular at least 99.5 wt. %.

In particular, the L-lactide monomer or the D-lactide monomer may contain at most 1 wt. % of other lactide monomers (e.g. lactide monomers with a different chirality or meso lactide). This also means that lactide monomers used in a method described herein generally are substantially enantiomerically pure (enantiopure), as monomers of a different chirality or meso lactide monomers are substantially absent.

In a preferred embodiment high quality lactide is used. High quality lactide is defined herein as lactide monomer with a low free acid content and a low water content.

Lactide monomers used in a method as described herein preferably have a free acid content of at most 50 milliequivalents per kg (meq/kg), based on the equivalents of free acid per kilogram of lactide monomer, preferably of at most 20 meq/kg and most preferably of at most 10 meq/kg. The free acid content of lactide monomer samples can be determined by titration with 0.01 M $CH_3OK$ in dichloromethane and methanol using, e.g., a Titrino 736 apparatus.

Lactide monomers used in a method as described herein preferably have a water content of at most 2000 ppm, preferably at most 500 ppm, more preferably at most 300 ppm or at most 200 ppm and even more preferably at most 100 ppm. The water content of lactides can be determined by a typical Karl-Fischer titration.

The use of high quality lactide is preferred as renders the production method more economical, with a higher polymerisation rate with better average molecular weight control.

In several embodiments lactide monomers used in a method as described herein may respectively have a L-lactide and D-Lactide content of at least 99 wt. %, a free acid content of at most 10 meq/kg and a water content of at most 300 ppm.

Commercially available lactide monomers which may be used in a process as described herein include L-lactide PURALACT® L and D-lactide PURALACT® D both available from Corbion Purac (The Netherlands).

A method as described herein comprises polymerizing the first lactide monomer to provide a first polymerization mixture comprising a polymer of the first lactide monomer and a residual amount of the first lactide monomer (step a).

Said first lactide monomer is selected from L-lactide monomer and D-lactide.

As indicated above, the melt polymerization of lactide is known in the art and it is within the scope of a skilled person to select appropriate polymerization conditions.

The polymerization of step a) is performed at a temperature at which the monomeric lactide and the polymeric lactide are in molten form. Typically, polymerization may be performed at a temperature from 110 to 275° C., in particular from 130 to 250° C. In several embodiments the polymerization of step a) may be performed at a temperature from 110 to 230° C., in particular from 150 to 180° C.

The lactide monomer may be added to the reactor in molten form or may be added to the reactor in solid form and allowed to melt therein.

A polymerization catalyst may be generally added to the lactide monomer after it is already molten. Polymerization additives as described above (co-catalysts and initiators in particular), may be added to the lactide monomer prior to or after the catalyst.

A polymerization catalyst (and any polymerization additives) may be added to the lactide monomer in any suitable form, for instance, in solid form or liquid form (e.g. in solution or in suspension). It is within the scope of a skilled person to choose an appropriate form.

With respect to the type and amount of catalyst reference is made to what it is described above.

The residual amount of the first lactide monomer in the first polymerization mixture may generally be from 1 to 20 wt. % relative to the weight of the first polymerization mixture, in particular from 2 to 10 wt. %, and more in particular from 3 to 6 wt. %. In several embodiments, relatively low amounts of residual first lactide monomer (e.g. from 2 to 6 wt. %) may be preferred as they may advantageously further increase the melting point of the final lactide block copolymer. In several embodiments, relatively high amounts of residual first lactide monomer (e.g. from 6 to 10 wt. %) may be preferred, as this may provide a larger amount of amorphous material in the final product. In turn, this may facilitate processing in combination with plasticizers or other additives.

The residual amount of lactide monomer may be determined by methods known in the art. For instance, it may be determined by a precipitative method to separate the monomeric lactide from the polymeric lactide in the polymerization mixture. For instance, a sample of the first polymerization mixture (comprising polylactide and lactide monomer) may be dissolved in a known amount of dichloromethane (including internal standard). The polylactide fraction of the polymerization mixture can be removed by precipitation by introducing the dichloromethane solution into an excess amount of 5/95 acetone/hexane. After half an hour of precipitation, the polylactide fraction can be removed by filtration over a 0.45 μm filter. The remaining solution can then be analyzed using Gas Liquid Chromatography, to determine the amount of lactide monomer in the sample.

As indicated above, a method as described herein does not require subjecting the first polymerization mixture to a step for removing the residual lactide monomer (e.g. does not require a devolatilization step). Hence, in several embodiments in a method as described herein no step for the removal of residual first lactide monomer (such as a devolatilization step) is performed on the first polymerization mixture, i.e. between step a) and step b).

It may be preferred to provide a first polymerization mixture with the lowest possible amount of residual lactide monomer, without subjecting the polymerization mixture to a step for removing the residual lactide monomer (e.g. without performing a devolatilization step). As a skilled person knows the lowest amount of residual lactide monomer is achieved when the polymerization reaches its thermodynamic equilibrium, which is determined by the temperature at which the reaction is performed. Given the thermodynamics of the lactide melt polymerization reaction, a conversion of 100% is thus never achieved. As the polymerization reaction reaches equilibrium the residual amount of lactide monomer will remain constant. The point at which the polymerization reaches its thermodynamic equilibrium may therefore be determined by monitoring the amount of residual lactide monomer during the course of polymerization as described above. The actual amount of residual lactide monomer which is obtained at the thermodynamic equilibrium depends on the temperature of the final reaction mixture. As a mode of example, the amount of residual monomer at the thermodynamic equilibrium may generally be from 2 to 10 wt. %, and more in particular from 3 to 6 wt. % at the typical melt polymerization temperatures mentioned herein.

Polymerization mixtures with a higher amount of residual monomer may be achieved by not allowing the polymerization to reach completion. In a method as described herein Lids may be preferably performed by adding an amount of a lactide monomer of different chirality (second lactide monomer) to the polymerization mixture and proceed with step b) as described in detail below.

The polymerization time of step a) may depend on the targeted residual amount of first lactide monomer in the polymerization mixture comprising polymeric lactide, in other words by the targeted degree of conversion. For instance, if a low amount of residual lactide monomer is desired the polymerization may be allowed to reach completion (i.e. to reach its thermodynamic equilibrium). Factors that may influence the time at which the targeted degree of conversion is reached include, for instance, the polymerization conditions, the polymerization catalyst and, in a continuous process, residence time in a reactor.

As a mode of example, the polymerization time of step a) may be from 10 minutes to 8 hours, in particular from 20 minutes to 6 hours, more in particular from 30 minutes to 5 hours, and even more in particular from 1 hour to 4 hours, e.g. about 2 hours.

The first polymerization mixture comprising a polymer of the first lactide monomer and a residual amount of the first lactide monomer of step a) may be obtained in a different site than the site where subsequent steps b) and c) may be performed. For instance, the first polymerization mixture may be a commercial lactide polymer of L-lactide or of D-lactide, having a residual amount of the lactide monomer used for its preparation.

A method as described herein comprises adding a first amount of the second lactide monomer to the first polymerization mixture and polymerizing the resulting mixture to provide a second polymerization mixture comprising a copolymer having a polymeric block of the first lactide monomer and a copolymeric block the first and the second lactide monomers (step b).

The second lactide monomer is selected from D-lactide and L-lactide and it is of a different chirality than the first lactide monomer. For instance, when the first lactide monomer is L-lactide the second lactide monomer is D-lactide and when the first lactide monomer is D-lactide the second lactide monomer is L-lactide.

Said first amount of second lactide acts as a sacrificial amount reacting with the residual amount of first lactide and providing a copolymeric block of the first and second lactide monomers. In this manner the distribution of residual amount of first lactide monomer within the subsequent lactide polymeric block can be controlled and minimized.

Given the reduced amount of residual first lactide monomer in the second polymerization mixture, the majority of the residual amount of the first lactide monomer in the first polymerization mixture is distributed within the copolymeric block obtained in step b). In particular, substantially all of the residual first lactide monomer may be distributed within the copolymeric block formed in step b). As used herein, substantially all means that from 90 to 100 wt. % of the residual amount of the first lactide monomer is distributed within the copolymeric block, in particular at least 95 wt. %, more in particular at least 99 wt. %. Accordingly, the polymeric block of the second lactide monomer obtained in step c) will generally have a highly reduced amount (if any) of repeating units derived from the first lactide monomer, resulting in a polymeric block of the second lactide monomer with enhanced enantiomeric purity.

A first amount of the second lactide monomer in a method as described herein may be from 1 to 50 wt. % relative to the total amount of lactide monomer used for the production of the lactide block copolymer, in particular from 2 to 30 wt. %, more in particular from 3 to 20 wt. %, and yet more in particular from 5 to 10 wt. %. Generally, the higher the first amount of second lactide monomer, the larger will be the copolymeric block obtained in step b). In several embodiments, a relatively low amount of second lactide monomer (e.g. from 1 to 10 wt. %) may be preferred in order to minimize the size of the copolymeric block. Small copolymeric blocks may advantageously increase the amount of stereocomplex crystals in the final lactide block copolymer. In several embodiments a relatively high amount of second lactide monomer (e.g. from 5 to 50 wt. % or from 10 to 30 wt. %) may be preferred, resulting in a relatively large copolymeric block. Relatively large polymeric blocks may have advantages in the processing and the final mechanical properties of the material.

It is generally preferred for the first amount of the second lactide monomer to be higher than the residual amount of first lactide monomer. When the first amount of second lactide monomer is higher than the residual amount of first lactide monomer substantially all, preferably all, the first lactide monomer will be distributed within the copolymeric block formed in step b), as indicated above.

In several embodiments, a first amount of the second lactide monomer relative to the residual amount of first lactide monomer may be from 50:1 to 1:1 weight by weight, in particular from 25:1 to 1:1, more in particular from 10:1 to 1:1, more in particular from 5:1 to 1:1, yet more in particular from 2:1 to 1:1, and even more in particular from 1.75:1 to 1:1.

A first amount of second lactide monomer is generally added to the first polymerization mixture once the desired conversion is reached in step a) (as described above).

Optionally, an additional amount of catalyst, co-catalyst, initiator or other polymerization additives may be added prior to, together with or after the addition of the first amount of second lactide monomer. With respect to the types and amounts of catalyst, co-catalyst, initiator and other polymerization additives reference is made to what is described above.

A first amount of second lactide monomer may be added to the first polymerization mixture in any suitable mode of addition, e.g., in a single addition or over several additions.

A single addition may be performed in a batch process by adding the whole first amount to the reactor all at once or continuously over a period of time (e.g. from 1 minute to 1 hour, from 5 to 30 minutes, or from 10 to 20 minutes). When the first amount of the second lactide monomer is added continuously over a period of time a gradient copolymeric block may be obtained.

A single addition may be performed in a continuous process by adding the whole first amount in a single point of addition at a constant flow rate or at an increasing flow rate.

Several additions may be performed in a batch process by adding fractions of the first amount of second lactide monomer to the reactor discontinuously in subsequent additions. For instance, a first fraction of the first amount may be added and allowed to polymerize before a second fraction of the first amount is added. As mode of example, the time between a fraction and a subsequent fraction may be from 1 minute to 1 hour, from 5 to 30 minutes, or from 10 to 20 minute).

The first amount of lactide may be added in increasing amounts, i.e., a fraction may be smaller than a subsequent fraction.

Several additions may be performed in a continuous process by adding fractions of the first amount of second lactide monomer at different points in a reactor, e.g. points distributed over the length of a plug flow reactor. Fractions of the first amount of second monomer may be added at a constant flow rate or at an increasing flow rate. The first amount of second monomer may also be added in increasing amounts in a continuous process. For instance, the flow rate at which a fraction is added to the first polymerization mixture may be lower that the flow rate at which a subsequent fraction is added.

The mode of addition of the first amount of second lactide monomer generally influences the distribution of the residual first lactide monomer within the copolymeric block. For instance, if the second lactide monomer is added to the first polymerization mixture in a single addition, the first lactide monomer may generally be randomly distributed within the copolymeric block, i.e. the copolymeric block is a random copolymer. If the first amount of second lactide monomer is added in increasing amounts, e.g. over several additions or by using a single addition with an increasing flow rate, then the presence of the first lactide monomer within the copolymeric block may generally gradually decrease over the length of the copolymeric block, i.e. the copolymeric block is a gradient copolymer.

The second lactide monomer may be added to the first polymerization mixture in any suitable form. For instance, the second lactide monomer may added in molten form, i.e. the second lactide monomer may be melted prior to its addition to the polymerization mixture. The temperature at which the second lactide monomer is molten may be lower than the polymerization temperature. Alternatively, the second lactide monomer may be added in solid form and allowed to melt in the polymerization mixture.

As indicated above, the melt polymerization of lactide is known in the art and it is within the scope of a skilled person to select appropriate polymerization conditions.

The polymerization of step b) is performed at a temperature at which monomeric lactide and polymeric lactide are in molten form. Typically, the polymerization may be performed at a temperature from 110 to 275° C., in particular from 130 to 250° C. In several embodiments the polymerization of step b) may be performed at a temperature from 110 to 230° C., in particular from 150 to 180° C.

The polymerization time of step b) may depend on various factors such as the polymerization conditions, the polymerization catalyst, the desired degree of conversion and the properties of the polymerization product. Preferably, the polymerization of step b) may be carried out until it reaches completion (i.e. reaches its thermodynamic equilibrium). The point at which the polymerization reaches its thermodynamic equilibrium may be determined as described above for step a).

As a mode of example, the polymerization time of step b) may be from 1 minute to 5 hours, in particular from 5 minutes to 2 hours, more in particular from 15 minutes to 1 hour.

A method as described herein comprises adding a second amount of the second lactide monomer to the second polymerization mixture and polymerizing the resulting mixture to provide a third polymerization mixture comprising a copolymer having a polymeric block of the first lactide monomer, a copolymeric block of the first and the second lactide monomers, and a polymeric block of the second lactide monomer (step c).

The lactide monomer of step c) is the same lactide monomer as used in step b). For instance, if a first amount of L-lactide is added and polymerized in step b) then a second amount of L-lactide is added and polymerized in step c). If a first amount of D-lactide is added and polymerized in step b) then a second amount of D-lactide is added and polymerized in step c).

A second amount of the second lactide monomer may be from 1 to 50 wt. % relative to the total amount of lactide monomer used for the production of the lactide block copolymer, in particular from 5 to 50 wt. %, more in particular from 25 to 50 wt. %. Generally, the higher the second amount of second lactide monomer, the larger will be the polymeric block obtained in step c).

It may be generally preferred for the second amount of second lactide monomer to be higher than the first amount of second lactide monomer. Thereby, in the final lactide block copolymer, the polymeric block of the second lactide monomer may generally be larger than the copolymeric block of the first and second lactide monomers. As a result, a larger amount of stereocomplex crystals will generally form in the final lactide block copolymer.

In several embodiments the total amount of second lactide (taking into account the first and second amounts) with respect to the total amount of first lactide used in the preparation of the lactide block copolymer may be from 5:1 to 1:5 weight by weight, in particular from 2.5:1 to 1:2.5, and more in particular 1:1.

A second amount of second lactide monomer is generally added to the second polymerization mixture once the desired conversion (e.g. completion) is reached in step b).

Optionally, an additional amount of catalyst, co-catalyst, initiator or other polymerization additives may be added prior to, together with or after the addition of the second amount of second lactide monomer. Reference is made to what is described above with respect to the catalyst, co-catalyst, initiator and other polymerization additives.

The second amount of second lactide monomer may be added to the second polymerization mixture in any suitable mode of addition, e.g., in a single addition or over several additions. The second lactide monomer may be added to the second polymerization mixture in any suitable form. What is described above with respect to the mode and form of addition for the first amount of second monomer for step b) also applies here.

As indicated above, the melt polymerization of lactide is known in the art and it is within the scope of a skilled person to select appropriate polymerization conditions.

The polymerization of step c) is performed at a temperature at which the monomeric lactide and the polymeric lactide are in molten form. Typically, the polymerization may be performed at a temperature from 110 to 275° C., in particular from 130 to 250° C. In several embodiments the polymerization of step c) may be performed at a temperature from 160 to 250° C., in particular from 180 to 220° C.

In several embodiments the polymerization of steps a) and b) is performed at a lower temperature than the polymerization temperature of step c).

The polymerization time of step c) may depend on various factors such as the polymerization conditions, the polymerization catalyst, the degree of conversion and the properties of the polymerization product. Preferably, the polymerization of step c) may be carried out until it reaches completion (i.e. reaches its thermodynamic equilibrium). The point at which the polymerization reaches its thermodynamic equilibrium may be determined as described above for step a).

As a mode of example, the polymerization time of step c) may be from 10 minutes to 8 hours, in particular from 20 minutes to 6 hours, more in particular from 30 minutes to 5 hours, and even more in particular from 1 hour to 4 hours, e.g. about 2 hours.

Generally, under a given set of polymerization conditions, the higher the polymerization time the higher the molecular weight of the lactide block copolymer and the higher de degree of conversion of monomeric lactide into polymeric lactide. Polymerization times lower than 10 minutes may not bring about sufficient conversion and/or a desired molecular weight. Polymerization times greater than 8 hours generally do not improve conversion (because of the thermodynamic equilibrium) and, moreover, will generally result in significant amounts of thermal degradation of the polymer, usually accompanied by discoloration and molecular weight decline.

A third polymerization mixture obtained in step c) comprises a lactide block copolymer as described herein and may generally comprise residual amounts of second lactide monomer. Generally the main component of the third polymerization mixture is a lactide block copolymer as described herein. For instance, the third polymerization mixture obtained in step c) may comprise at least 90 wt. % of lactide block copolymer, in particular at least 95 wt. %, more in particular at least 98 wt. %, and yet more in particular at least 99 wt. %.

The third polymerization mixture comprising the lactide block copolymer may be used directly in its end-use applications or may be subjected to one or several treatments prior to use, e.g. to increase its purity, to increase its stability and to improve its color.

In several embodiments the third polymerization mixture may be subjected to a devolatilization step to remove volatiles, in particular unreacted monomer from molten or solid polymer. The volatiles are generally removed at elevated temperature (e.g. from 180 to 275° C.) under reduced pressure (e.g. under vacuum). After a devolatilization step lactide monomer may be generally present in an amount of less than 2 wt. %, more in particular in an amount of less than 1 wt. %, still more in particular in an amount of less than 0.5 wt. %, yet more in particular of less than 0.3 wt. %. Examples of devolatilizers include extruders, especially twin screw extruders, wiped film evaporators, falling film evaporators, rotary devolatilizers, rotary disk devolatilizers, centrifugal devolatilizers, flat plate devolatilisers, and static expansion chambers involving special distributors, e.g., devolatilization technology as described in EP1800724.

In a process as described herein, performing a devolatilization step after step c) may be preferred, as the presence of substantial amounts of lactide monomer in the polymer may detrimentally affect the mechanical properties and processing behavior of the polymer. For instance, a devolatilization step may further improve the long-term stability of the lactide block copolymer.

Alternatively or additionally (prior to or simultaneously with the devolatilization step), the third polymerization mixture may be subjected to a stabilization step. Said stabilization step comprises treatment of the third polymerization mixture with a stabilizing additive (compound that increases the stability of the lactide block copolymer against, e.g., depolymerization, discolouring, molecular weight decline and degradation in general). Examples of suitable stabilizing additives include, for instance, organic peroxides, organic hydroperoxides, phenolic anti-oxidants, phosphites, radical scavengers, chain extenders, catalyst deactivating agents, endcapping agents (such as succinic anhydride) and mixtures thereof. Antioxidants, organic peroxides and phosphites may be preferred as stabilizing additives, in particular when the catalyst applied is a Sn(II)-based catalyst.

The third polymerization mixture may be treated with the stabilisation compounds by admixing the stabilizing additive with the third polymeric mixture, e.g., at a temperature of the same order as the polymerisation temperature. This can be done by means of a static mixer, an extruder, or any other conventional way of mixing materials of which at least one is highly viscous.

The third polymerization mixture (with or without having been subjected to devolatilization and/or stabilization steps) may also be allowed to solidify to form a solid intermediate product. During or after solidification the third polymerization mixture may be converted to particles such as beads, chips or other pelletized or powdered products in manners known in the art and then sold to end-users. Said intermediate product may then be further processed for its final application.

In several aspects, the instant invention further relates to a lactide block copolymer having a polymeric block of L-lactide and a polymeric block of D-lactide separated by a copolymeric block of L-lactide and D-lactide. Such lactide block copolymers are obtainable by a method as described herein.

A polymeric block of D-lactide and a polymeric block of L-lactide as used herein refers to a fragment of a polymer which consists essentially of repeating units derived from D-lactide and from L-lactide respectively. Generally a polymeric block of L-lactide or D-lactide may be regarded as an homopolymer of L-lactide and D-lactide respectively. A polymeric block of L-lactide or of D-lactide of may generally comprise less than 1 wt. % of repeating units derived from a lactide of opposite chirality with respect to the total weight of the polymeric block, in particular less than 0.75 wt. % and yet more in particular less than 0.5 wt.

A copolymeric block of L-lactide and D-lactide as defined herein refers to a fragment of a polymer which consists essentially of repeating units derived from both L-lactide and D-lactide. A copolymeric block of L-lactide and D-lactide may generally have a weight ratio of repeating units derived from D-lactide relative to repeating units derived from L-lactide (or vice versa) of 1:1 to 1:25. A copolymeric block as described herein may generally be from 1 to 50 wt. % relative to the total weight of the block copolymer, in particular from 2 to 30 wt. %, more in particular from 3 to 20 wt. %, and yet more in particular from 5 to 10 wt. %. In a lactide block copolymer as described herein, The weight of the polymeric block of L-lactide, polymeric block of D-lactide and copolymeric block of L-lactide and D-lactide add to 100 wt. %.

A copolymeric block as described herein may be a random copolymer or a gradient copolymer. In a random copolymer the repeating units derived from L-lactide and D-lactide are distributed randomly within the copolymeric block. In a gradient copolymer the distribution of repeating units derived from L-lactide and D-lactide exhibits a gradual change from predominantly one lactide monomer to predominantly the other lactide monomer, e.g. from predominantly L-lactide to predominantly D-lactide or vice versa. In particular, a gradient copolymeric block separating a block of polymeric L-lactide and a block of polymeric D-lactide as described herein may generally have a gradual change from predominantly L-lactide to predominantly D-lactide in the direction from the block of polymeric L-lactide to the block of polymeric D-lactide.

A lactide block copolymer as described herein may generally have a ratio of repeating units derived from the first lactide monomer with respect to the second lactide monomer from 90:5 to 5:90 weight by weight, in particular from 70:30 to 30:70, and more in particular from 60:40 to 40:60. As a mode of example an ratio of 50:50 may be mentioned.

A lactide block copolymer as described herein may generally have a melting peak at 190° C. or higher as measured by differential scanning calorimetry (DSC) using a heating rate of 5K/min, in particular at from 195 to 250° C., more in particular from 200 to 230° C., and even more in particular from 205 to 225° C. The melting peak may be measured by differential scanning calorimetry (DSC) as described in the standard method ASTM D3418. For instance, DSC may be executed on TA Instruments Q2000 and heating and cooling rates of 5 K/min may be used.

A lactide block copolymer as described herein may have more than one melting peak as measured by DSC. This may be the case if, e.g., both stereocomplex and homopolymer crystallites are present in the block copolymer product. Mixtures of stereocomplex and homopolymer crystallites may be obtained, e.g., if the ratio of repeating units derived from L-lactide is with respect to repeating units derived from D-lactide is very high (e.g. 95:5).

A lactide block copolymer as described herein may generally have an absolute weight-average molecular weight (Mw) from 30 000 to 200 000 g/mol as measured by gel permeation chromatography (GPC) using light scattering detection in hexafluoroisopropanol (HFiP), in particular from 40 000 to 175 000 g/mol, more in particular from 50 0000 to 150 000 g/mol.

The molecular weight distribution (Mw/Mn), also known as polydispersity index (PDI) of a lactide block copolymer as described herein may be from 1.0 to 3.0, in particular from 1.2 to 2.5, and more in particular from 1.5 to 2.0.

Absolute molecular weight parameters Mn, Mw and polydispersity index (PDI) may be determined using Gel Permeation Chromatography (GPC) with, e.g., hexafluoroisopropanol as a solvent and with light scattering. In particular, a Viscotek GPC Mx VE2001 system may be used with hexafluoroisopropanol (also known as 1,1,1,3,3,3-hexafluoro-2-propanol or HEiP) with 0.02 M $CF_3COOK$ as solvent at a flow rate of 0.7 mL/min. Two PSS PFG analytical linear columns (M, 300×8.00 mm, 7 μm) connected in series may be used as size exclusion columns.

A lactide block copolymer as described herein (and in particular as obtained in a method as described herein) advantageously has good properties, in particular a high melting point (e.g. from 190 to 250° C. as described above), which makes it useful in multiple applications.

Accordingly, the instant invention relates to articles, preferably molded articles, comprising a lactide block copolymer as described herein. A lactide block copolymer as described herein may be particularly useful in applications wherein the material is required to withstand relatively high temperatures, such as temperatures at which other bioplastics (e.g. homopolylactic acid) may suffer from softening or melting (e.g. from 60 to 200° C.)

A lactide block copolymer as described herein (e.g. obtained in a process as described herein) may be further processed by means known in the art for its end-use application. Further processing may be performed by, e.g., extrusion, injection molding, injection stretch blow molding, blow-molding, film casting, film blowing, thermoforming, foaming, or fiber-spinning. Generally further processing may be performed to form useful articles (e.g., molded articles) including, for example, films, sheets, fibers, clothes, nonwoven fabrics, medical goods (e.g. controlled release drug delivery systems), packaging (e.g. containers for foods and beverages such bottles, bags and wrapping), catering items (such as cutlery, cups, plates and bowls), agricultural materials, gardening materials, fishery materials, civil engineering-construction materials, stationeries, electric and electronic parts (e.g. casings), automotive parts, or the like.

If so desired, a lactide block copolymer as described herein may be compounded with additives such as antioxidants, nucleating agents, fillers (e.g. mineral fillers, glass or natural fibers), processing aids (e.g. lubricants, plasticizers, mold-releasing agents), photostabilizers (e.g. UV-stabilizers or UV-absorbers), heat stabilizers, antistatic agents, flame retardants, foaming agents, antibacterial-antifungal agents, coloring agents (e.g. dyes and pigments), or other polymer additives known to a skilled person.

With the method described herein, one has the additional advantage of being able to synthesize a block copolymer containing both amorphous (gradient) blocks and blocks that are able to crystallize into sc-PLA. Without the use of a gradient block, this cannot be achieved.

The present invention is further illustrated by the following Examples, without being limited thereto or thereby.

EXAMPLES

Materials

PuraLact® L (CAS#4511-42-6) and PuraLact® D (CAS#95-96-5) obtained from Corbion Purac (The Netherlands) and of a purity of 99 wt. % were used as L-lactide monomer and D-lactide monomer respectively.

Tin octoate (CAS#301-10-0) obtained from Sigma of a purity of about 95% was used as the catalyst. The catalyst was used as a 10% solution in toluene (CAS#108-88-3) obtained from Acros and of a purity of 99%.

As initiators 1,4-butanediol (CAS#110-63-4) obtained from Acros and of a purity of 99% and 2-ethyl-1-hexanol (CAS#104-76-7) obtained from Acros and of a purity of 99% were used.

As catalyst deactivator a mixture of mono and distearyl phosphate (ADK Stab AX-71) obtained from Adeka Palmarole was used.

Triphenyl phosphine (CAS#603-35-0) was used as a stabilizing additive as received from ACROS (99% pure).

General Methods

The amount of residual lactide in a polylactide sample may be determined by a precipitative method to separate the monomeric lactide from the polymeric lactide in the polymerization mixture. A sample of the first polymerization mixture (comprising polylactide and lactide monomer) is dissolved in a known amount of dichloromethane (including internal standard). The polylactide fraction of the polymerization mixture is then removed by precipitation by introducing the dichloromethane solution into an excess amount of 5/95 acetone/hexane solvent mixture. After half an hour of precipitation, the polymeric fraction is removed by filtration over a 0.45 μm filter. The remaining solution is then be analyzed using Gas Liquid Chromatography, to determine the amount of lactide monomer in the sample.

Absolute molecular weight parameter Mn, Mw and polydispersity index (PDI) were determined using Gel Permeation Chromatography (GPC) with light scattering detection, unless mentioned otherwise. In particular, A Viscotek GPC Mx VE2001 system was used with 1,1,1,3,3,3-hexafluoro- 2-propanol (also known as hexafluoroisopropanol or HFiP) with 0.02 M $CF_3COOK$ as solvent at a flow rate of 0.7 mL/min. The size exclusion columns used were two PSS PFG analytical linear columns (M, 300×8.00 mm, 7 µm) connected in series. 20-25 mg of a sample of polymerization mixture was weighed in a 20 ml crimp cap vial and 17 gram HFiP were added thereto. The suspension obtained was shaken for at least 16 hours at room temperature. After 16 hours 1 ml of the sample was filtered through a PVDF 0.45 µm filter, transferred to a 2 ml vial and injected to the GPC system for analysis.

The optical purity of monomeric lactide and polymeric lactide was assessed by destructive methylation, relying on a chiral Gas chromatography (GC) resolution of the methyl lactates. The ratio of R- and S-methyl lactates (derived from D-lactide and L-lactide respectively) determines the stereochemical purity of the sample Free acid content of lactide samples was determined by titration with 0.01 M $CH_3OK$ in dichloromethane and methanol using a Titrino 736 apparatus.

Characterization of melting peaks was performed by determining thermal transitions of the lactide block copolymer by differential scanning calorimetry (DSC). DSC may be executed, e.g., on a TA Instruments Q2000. To that end, 3-7 mg of polymeric lactide sample was weighed into a T-zero hermetic pan. The heating and cooling rates used were 5 K/min.

Comparative Example 1

Preparation of Stereochemically Pure Poly(L-lactide)

In a 2 L stainless steel reactor under nitrogen atmosphere, 520 g L-lactide was added and was allowed to melt under increasing temperature to 130° C. Next, 1.26 g 2-ethyl-1-hexanol was added to the reactor using a syringe. Subsequently, the polymerization was commenced by addition of 0.73 g of a 10% tin octoate solution in toluene as the catalyst and the temperature of the reactor was allowed to reach 180° C. The addition of the catalyst was taken as t=0. The polymerization was allowed to proceed under stirring, while taking reaction mixture aliquots for analysis purposes. After 120 minutes of polymerization, conversion had reached thermodynamic equilibrium, providing a polymerization mixture comprising poly(L-lactide) (PLLA) and a residual amount of L-lactide monomer of 4.0 wt. %. To stabilize the reaction mixture, 0.5 g ADK Stab AX-71 was added to the reactor and blended for 20 minutes.

The entire contents of the reactor were subsequently off-loaded and the reaction product was cut into cm-sized granules. These granules were subjected to a degassing step at 130° C. and 5 mbar during 16 hours. The final product had an absolute molecular weight as determined by GPC in HFiP using light scattering detection of $M_w$=65.000 g/mol. Residual amount of L-lactide monomer was 1.0 wt %. Differential scanning calorimetry (DSC) revealed that the polymer had a melting point during the first heating scan of 176° C. Upon cooling the sample showed a crystallization peak at 102° C. and subsequent reheating showed a cold crystallization peak at 100° C. and a melting point at 170° C. This clearly shows that even high molecular weight, stereochemically pure poly(L-lactide) has a melting point far below that of stereoblock PLA and stereocomplex blend PLA (as illustrated by comparative example 2 and examples 1 and 2 below).

Comparative Example 2

Preparation of a Stereocomplex Blend of Poly(L-lactide) and Poly(D-lactide)

In an attempt to create a full stereocomplex blend of PLA resin, 48.5 wt % poly(L-lactide) ($M_w$=208 kg/mol as measured in chloroform versus polystyrene) and 48.5 wt % poly(D-lactide) ($M_w$=141 kg/mol as measured in chloroform versus polystyrene) were compounded with 3 wt % talc (Luzenac A10XC) using a Berstorff ZE 25 (CL) co-rotating twin-screw extruder (L/D=40) operating at 300 rpm. The temperature zones of the extruder varied from 20° C. at the feed zone to 215° C. in the mixing zones to 205° C. at the die head. After strand pelletizing, drying and crystallization, DSC showed the presence of both homopolymer melting peaks around 170-175° C. in addition to the stereocomplex melting peak around 210-240° C. Clearly, selective crystallization into stereocomplex-PLA (sc-PLA) was not achieved. The DSC thermogram of Comparative Example 2 is shown in FIG. 1. Line (A) of the graph shows the first heating curve of the DSC scan, line (B) shows the cooling curve of the DSC scan and line (C) shows the second heating curve of the DSC scan.

Example 1

Preparation of Lactide Block Copolymer According to the Invention

In a 2 L stainless steel reactor under nitrogen atmosphere, 760 g L-lactide was added and was allowed to melt under increasing temperature to 130° C. Next, 2.03 g 2-ethyl-1-hexanol (as the initiator) and 0.177 g triphenylphosphine (as stabilizing additive) were added to the reactor using a syringe. Subsequently, the polymerization was commenced by addition of 1.09 g of a 10% tin octoate solution in toluene as the catalyst and the temperature of the reactor was allowed to reach 180° C. The addition of the catalyst was taken as t=0. The polymerization was allowed to proceed under stirring, while taking reaction mixture aliquots for analysis purposes. After 90 minutes of polymerization, conversion had reached thermodynamic equilibrium, providing a polymerization mixture comprising polymeric L-lactide (PLLA) and a residual amount of L-lactide monomer of about 4 wt. %. A sample was taken for analysis (PLLA-block). Subsequently, an amount of 136.4 g of D-lactide was added in a single portion to the polymerization mixture and allowed to polymerize at the same temperature (180° C.). After 20 minutes a sample of the second polymerization mixture obtained was taken for analysis (PLLA-copolymer diblock). A supplementary amount of 650 g of D-lactide was added to the polymerization mixture while the temperature of the mixture was raised to 190° C. Taking into account the samples removed during the formation of the first L-lactide block for analysis purposes, the supplementary amount of D-lactide added was chosen to obtain a 1:1 ratio of PLLA to PDLA blocks. The polymerization was allowed to proceed for another 120 min. The reaction was terminated by addition of 1.2 g ADK Stab AX-71 as the catalyst deactivator and allowed to blend for 15 min before offloading the entire batch. Finally, the batch was placed in a vacuum oven overnight (130° C., 5 mbar).

Figure 2:
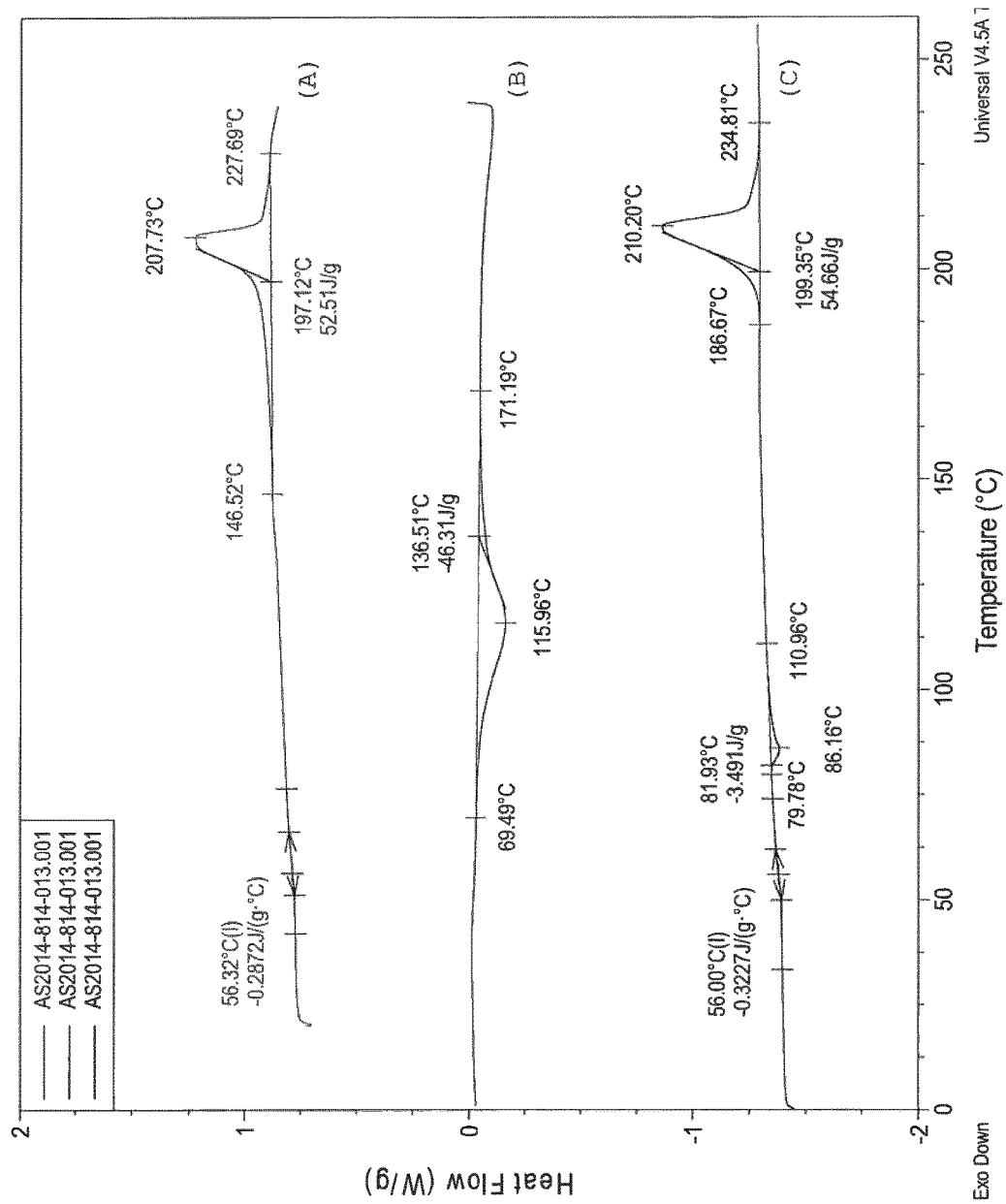

Analysis results indicated that the third and final polymerization mixture (PLLA-copolymer-PDLA triblock) had an $M_w$=83 000 g/mol (PDI=1.74) and 0.7% residual lactide monomer. DSC showed a melting peak in the first heating curve of 208° C. and a melting peak at 210° C. in the second heating curve. The DSC scan of the lactide block copolymer of Example 1 is shown in FIG. 2. Line (A) of the graph shows the first heating curve of the DSC scan, line (B) shows the cooling curve of the DSC scan and line (C) shows the second heating curve of the DSC scan. It is noteworthy that the block copolymer still shows only a stereocomplex melting peak in the second heating curve, after being molten (during the first heating curve), solidified and remolten (during the second heating curve).

Example 2

Preparation of Lactide Block Copolymer According to the Invention

A lactide block copolymer was prepared as described above for Example 1, but with the difference that the second polymerization mixture comprising the PLLA and copolymer blocks was not produced by a single addition of the second lactide. Instead, three portions of D-lactide were used to produce the second polymerization mixture. In addition, a bifunctional initiator was used, thus effectively synthesizing a pentablock copolymer (PDLA-copolymer-PLLA-copolymer-PDLA). To that end, in the identical vessel to Example 1, 760 g of L-lactide was polymerized after melting, initiated by 2.4 g butanediol and catalyzed by 1.16 g of a 10 wt % solution of tin octoate in toluene. The polymerization was performed at 180° C. for 180 minutes at which point the residual amount of L-lactide was 5.0%. At the same reaction temperature, three batches of D-lactide (50 g, 20 g and 5 g) were added to the reaction mixture, in 5 minute intervals. After addition of the last 5 g batch, polymerization was allowed to occur for 20 minutes to provide a second polymerization mixture. Subsequently, a final amount of 615 g of D-lactide was added to the reaction mixture, to create a third polymerization mixture comprising the final block copolymer. The temperature of the reaction mixture was simultaneously raised to 210° C. After two hours of polymerization, 1.57 g of ADK Stab AX-71 was added to stop the reaction. The reactor content was off-loaded and subjected to degassing as described in Example 1. The final block copolymer had an absolute molecular weight $M_w$=51.000 g/mol. The DSC thermograms revealed the presence of a melting point at 198° C. and upon cooling an reheating again showed a stereoblock melting peak around 199° C.

The block copolymer obtained has a melting point which is significantly higher than that of stereochemically pure PLLA and in contrast to a blend of PDLA and PLLA does not show homopolymer melting peaks, which confirms the selective crystallization into stereocomplex PLA (comparative examples 1 & 2). The melting point observed is lower than that of the lactide block copolymer of Example 1 probably due to the difference in the copolymer structure derived from the use of a difunctional initiator and/or the different mode of addition of the second lactide monomer.

This example illustrates that the properties of the final lactide block copolymer can be modulated with the method of the invention by choosing, e.g., the type of initiator and/or mode of addition.

Example 3

Preparation of an Injection Molded Specimen from the Final Product of Example 1

The final product of Example 1 was dried for 4 hours at 83° C. Next this mixture was molded under nitrogen atmosphere using an DEMAG Ergotech NC IV 25-80 compact injection molding apparatus equipped with a standard PE-screw and a hot runner mold for test samples according to ISO 527-2 (dumb bell specimen type 1BA). Cylinder temperatures were 40/170/220/220/220 and cooling time was 35 s at a mold temperature of 140° C.

After conditioning for 1 week at 20° C. at 50% relative humidity, the test bars were subjected to mechanical analyses according to ISO norm ISO 527-1. Results are listed in Table 1 below, which clearly shows that with the block copolymer material used, stiff tensile bars could be obtained with high heat resistance as reflected by a high heat deflection temperature (HDT-B) of 145° C.

TABLE 1

Mechanical Properties of molded stereoblock PLA test sample

| Property | Value |
| --- | --- |
| E-Modulus (MPa) | 3476 |
| Stress-max (MPa) | 46 |
| Strain at break (%) | 1.4 |
| HDT-B (° C.) | 145 |
| Vicat A (° C.) | 179 |

The invention claimed is:

1. A method for producing a lactide block copolymer by melt polymerization in the presence of a catalyst from a first lactide monomer and a second lactide monomer, the first and second lactide monomers being different from each other and being selected from L-lactide and D-lactide, wherein the method comprises the following steps:
   a. polymerizing the first lactide monomer to provide a first polymerization mixture comprising a polymer of the first lactide monomer and a residual amount of the first lactide monomer;
   b. adding a first amount of the second lactide monomer to the first polymerization mixture and polymerizing the resulting mixture to provide a second polymerization mixture comprising a copolymer having a polymeric block of the first lactide monomer and a copolymeric block of the first and the second lactide monomers;
   c. adding a second amount of the second lactide monomer to the second polymerization mixture and polymerizing the resulting mixture to provide a third polymerization mixture comprising a copolymer having a polymeric block of the first lactide monomer, a copolymeric block of the first and the second lactide monomers, and a polymeric block of the second lactide monomer.

2. The method according to claim 1, wherein in step a) the residual amount of the first lactide monomer in the first polymerization mixture is from 1 to 20 wt. % relative to the weight of the first polymerization mixture.

3. The method according to claim 1, wherein in step b) the first amount of the second lactide monomer is from 1 to 50 wt. % relative to the total amount of lactide monomer used for the production of the lactide block copolymer.

4. The method according to claim 1, wherein the method is a batch method.

5. The method according to claim 1, wherein the method is a continuous method.

6. The method according to claim 1, wherein the polymerization of steps a), b) and c) is performed at a temperature from 110 to 275° C.

7. The method according to claim 1, wherein the polymerization of steps a) and b) is performed at a lower temperature than the polymerization temperature of step c).

8. The method according to claim 1, wherein the polymerization of steps a) and b) is performed at a temperature from 110 to 230° C., and/or wherein the polymerization of step c) is performed at a temperature from 160 to 250° C.

9. The method according to claim 1, comprising adding a stabilizing additive to the third polymerization mixture of step c).

10. The method according to claim 1, further comprising subjecting the third polymerization mixture of step c) to a devolatilization step.

11. A lactide block copolymer having a polymeric block of L-lactide and a polymeric block of D-lactide separated by a copolymeric block of L-lactide and D-lactide.

12. The block copolymer of claim 11, wherein the copolymeric block is from 1 to 50 wt. % relative to the total weight of the block copolymer.

13. The block copolymer of claim 11, wherein the copolymeric block is a random copolymer or a gradient copolymer.

14. The block copolymer of claim 11 having a melting peak at 190° C. or higher as measured by differential scanning calorimetry (DSC).

15. The block copolymer of claim 11 having an absolute weight-average molecular weight (Mw) from 30 000 to 200 000 g/mol as measured by gel permeation chromatography (GPC in hexafluoroisopropanol) with light scattering detection.

16. An article, comprising the block copolymer of claim 11.

* * * * *